Figure 1:
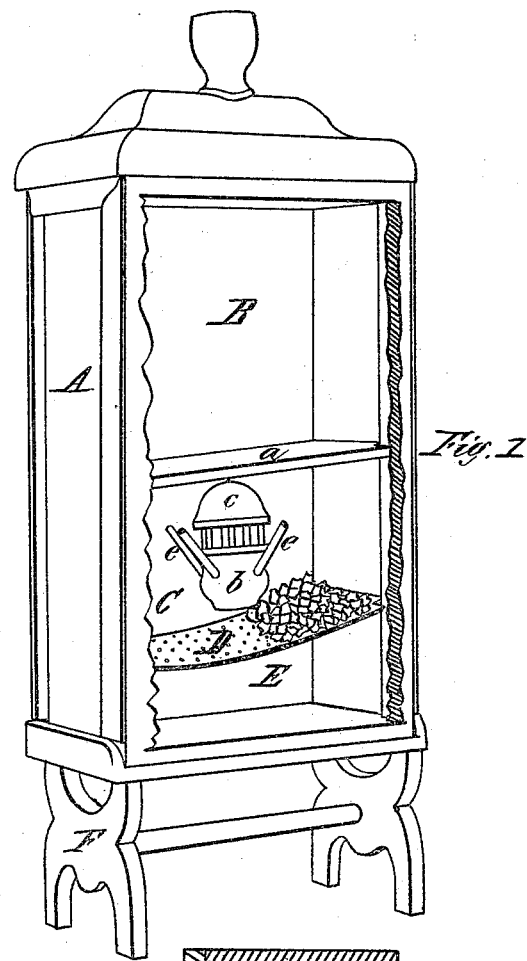
Figure 2:
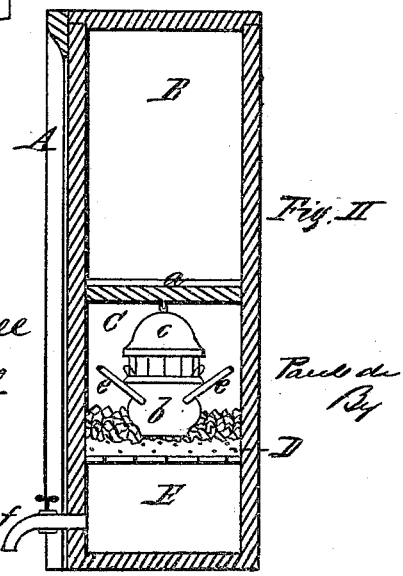

P. de la NEUVILLE.
WATER-FILTER AND PURIFIER.

No. 172,560. Patented Jan. 25, 1876.

Witnesses, F. E. Hall
M. R. Hall

Inventor,
Paul de la Neuville
By T. A. Curtis
his atty.

UNITED STATES PATENT OFFICE.

PAUL DE LA NEUVILLE, OF ENFIELD, CONNECTICUT, ASSIGNOR TO HIMSELF, H. HAMELIN, MOISE LEMIRE, AND SALOMON LA CHAPELLE.

IMPROVEMENT IN WATER FILTERS AND PURIFIERS.

Specification forming part of Letters Patent No. 172,560, dated January 25, 1876; application filed December 6, 1875.

*To all whom it may concern:*

Be it known that I, PAUL DE LA NEUVILLE, of Enfield, in the State of Connecticut, have invented a new and useful Improved Water Filter and Purifier; and that the following is a full, clear, and exact description thereof, reference being had to the accompanying drawings, making a part of this specification, and to the letters of reference marked thereon.

The object of my invention is to remove any foreign matter from water which might be held in solution, and render it clear and pure for drinking and culinary purposes; and to this end my invention consists of a tank divided into compartments, the bottom of the first or upper one being formed of a stone slab of a sufficiently porous character, the pores being previously cleared and opened by a treatment from acetic acid, so that the water will readily filter through said slab. The water within the middle compartment, after passing through the stone, is subjected to the action of the fumes of carbonic acid, and is again filtered through carbon, to remove all further inorganic matter which might remain.

Figure I is a perspective view of a tank made according to my invention, with the back portion removed, to more readily examine its interior construction and arrangement; and Fig. II is a vertical section of the same, on a line midway its width.

A represents the body of the tank, which, for convenience of drawing the water therefrom, as also for the sake of appearance, may be placed upon a stand, F, or may be otherwise suitably disposed. The interior of this tank is divided into three compartments by placing the partitions $a$ and D therein. The upper partition $a$ is placed, preferably, one end a little higher than the other, and is made of stone possessing the requisite porous character, that known as sandstone being quite suitable for the purpose. I first prepare this stone by placing it in a vessel containing acetic acid, and allowing it to remain for about one day, or applying that acid to it in such manner as to thoroughly open and clean the pores, and I then place it in water and allow it to remain about two days, to remove more thoroughly any acid which might remain.

The stone being from one-half an inch to an inch in thickness, the water will then filter through it, and be freed from much of the inorganic matter held in solution. This stone slab $a$ is then fitted into its place in the tank, and the joints around the edges made water-tight, forming the upper compartment B.

A plate, D, of metal, or of any suitable material, is then placed, say, a little lower than midway between the stone slab $a$ and the bottom of the tank, with one end a little higher than the other; and this plate has numerous perforations therein, with a layer of lumps of charcoal placed over its entire surface. The plate itself, however, may be made of carbon or other suitable material possessing the requisite porous characteristics, in which case the perforations in the plate and the layer of charcoal would not be required; but I prefer this perforated plate supplied with charcoal, as being cheap and easily changed or removed.

The middle or purifying compartment C is thus formed, as is also the lower compartment, E, and in the middle compartment I place, preferably by suspending it from the slab $a$, but disposing it in any convenient manner, a vessel, $b$, made of clay, and, if left open at the top, provided with a shield, $c$, to prevent the water from dripping into the vessel; and the latter may be provided with spouts $e$, to facilitate the escape of the fumes of the acid placed therein. The lower compartment E in the bottom of the tank is provided with an orifice, in which is secured a faucet, $f$, for drawing off the water when required for use.

For the purpose of purifying the water a quantity of carbonic acid is placed in the clay vessel $b$, and the tank being closed tight, the fumes of the acid escape freely into the compartment C. Water is placed in the upper compartment B and slowly filters through the stone slab $a$, falling upon the charcoal laid upon the perforated plate D. When the water has passed through the prepared stone slab it is freed from the inorganic matter held in solution, and while passing through the middle compartment C it is subjected to the action of the fumes of the carbonic acid which fill that compartment, and the animal life which might remain in the water to its detriment is thereby destroyed, and after the water is passed through the charcoal and plate D, the impurities are all removed, and the water rendered perfectly clear and pure, and may be drawn off for use through the faucet $f$. The charcoal may be removed from time to time, as may be found necessary, and after long use, if the pores of the stone slab should be found to have become filled up in a measure, the slab may be again treated with the acid, and the accumulated impurities removed. Some kinds of stone may be found which are sufficiently porous and clear to use without a previous treatment of acid, in which case that process of treatment may be omitted.

Having thus described my invention, what I claim as new is—

1. In an improved water filter and purifier, the combination of the tank A, the stone filtering-slab $a$, and the plate D, provided with a carbon filtering material, all substantially as and for the purpose described.

2. The combination of the tank A, the stone filtering-slab $a$, the vessel $b$, and the plate D, provided with a carbon filtering medium, all substantially as herein described.

PAUL DE LA NEUVILLE.

Witnesses:
T. A. CURTIS,
F. E. HALL.